(12) United States Patent
Mori

(10) Patent No.: US 9,625,311 B2
(45) Date of Patent: Apr. 18, 2017

(54) FLAME DETECTING SYSTEM

(71) Applicant: Azbil Corporation, Tokyo (JP)

(72) Inventor: Raita Mori, Tokyo (JP)

(73) Assignee: Azbil Corporation, Tokyo (JP)

( * ) Notice: Subject to any disclaimer, the term of this patent is extended or adjusted under 35 U.S.C. 154(b) by 0 days.

(21) Appl. No.: 15/164,248

(22) Filed: May 25, 2016

(65) Prior Publication Data
US 2016/0349109 A1    Dec. 1, 2016

(30) Foreign Application Priority Data

May 26, 2015 (JP) ................................ 2015-106032

(51) Int. Cl.
*G01J 1/42* (2006.01)
*H01J 19/82* (2006.01)

(52) U.S. Cl.
CPC .............. *G01J 1/429* (2013.01); *G01J 1/4204* (2013.01); *H01J 19/82* (2013.01)

(58) Field of Classification Search
CPC ............................ G01J 5/0014; G08B 17/125
See application file for complete search history.

(56) References Cited

U.S. PATENT DOCUMENTS 4,575,333 A * 3/1986 Bryant .................... F23N 5/203
431/18

2015/0348393 A1 * 12/2015 Margolin ................ F23N 5/123
340/577
2015/0369668 A1 * 12/2015 Watabe ................... H01L 37/02
250/338.3

FOREIGN PATENT DOCUMENTS

JP    2011-141290 A    7/2011
JP    2013-210284 A    10/2013

OTHER PUBLICATIONS

Japanese Application No. JP2015-106032, filed May 26, 2015.

* cited by examiner

*Primary Examiner* — Kiho Kim
(74) *Attorney, Agent, or Firm* — Amster, Rothstein & Ebenstein, LLP

(57) ABSTRACT

To easily obtain a quantity of received light with computation by only measuring pulses of an electric signal related to a flame sensor, a flame detecting system is disclosed comprising: a flame sensor to detect light and a calculating device, in which the calculating device includes an applied voltage generating portion configured to generate a pulse to drive the flame sensor, a voltage detecting portion configured to measure an electric signal flowing in the flame sensor, a storing portion configured to store sensitivity parameters of the flame sensor in advance, and a central processing unit configured to obtain a quantity of received light of a flame using parameters of a known quantity of received light, a pulse width, and a discharge probability of the sensitivity parameters, and a discharge probability obtained from an actual pulse width and the measured number of discharge times.

3 Claims, 4 Drawing Sheets

FLAME DETECTING SYSTEM

CROSS-REFERENCE TO RELATED APPLICATION

The present application claims the benefit of and priority to Japanese Patent Application No. 2015-106032, filed on May 26, 2015, the entire contents of which are incorporated by reference herein.

TECHNICAL FIELD

The present invention is related to a flame detecting system that detects the presence or absence of a flame.

BACKGROUND ART

Conventionally, an electron tube which is used for detecting the presence or absence of a flame on the basis of ultraviolet rays emitted from a flame in a combustion furnace or the like has been known. The electron tube includes a sealed container in which predetermined gas is filled and sealed, an electrode supporting pin that penetrates through the sealed container, and two electrodes that are supported in parallel with each other by the electrode supporting pin within the sealed container. In the electron tube, when one electrode arranged to oppose the flame is irradiated with ultraviolet rays in a state where a predetermined voltage is applied across the electrodes through the electrode supporting pin, electrons are emitted from the one electrode due to the photoelectric effect and excited in succession one after another to cause an electron avalanche between the one electrode and the other electrode. Therefore, it is possible to detect the presence or absence of a flame by measuring a change in impedance between electrodes, a change in voltage between electrodes, and electric current flowing between electrodes. Various methods for detecting the presence or absence of a flame have been suggested.

In the related art, there has been suggested a method in which electric current flowing between electrodes is integrated and it is determined that a flame is present in a case where an integrated value is greater than or equal to a predetermined threshold value and a flame is absent in a case where the integrated value is less than the predetermined threshold value (for example, see Patent Document 1). However, in the method, since electric current flowing between the electrodes is integrated, time for integration is required even when extinguishing the flame. Therefore, time is required until extinguishment of flames is detected. As a result, it is difficult to rapidly perform detection of the presence or absence of the flame.

In order to solve the problems described above, a flame detecting device disclosed in Patent Document 2 includes an electron tube which is provided with a pair of electrodes and in which electrons are emitted between the electrodes when the electrodes are irradiated with ultraviolet rays, an applying portion that applies a periodically changing voltage between the electrodes, a detecting portion that detects a voltage waveform representing a temporal change of the voltage between the electrodes, and an determining portion that determines the presence or absence of a flame on the basis of the voltage waveform. As such, the flame detecting device disclosed in Patent Document 2 detects the voltage waveform representing the temporal change of the voltage between the electrodes provided in the electron tube and determines the presence or absence of flames on the basis of the voltage waveform and thus, the time for integration is not required. Therefore, Patent Document 2 is an invention which is capable of rapidly performing detection of the presence or absence of the flame.

RELATED ART DOCUMENT

Patent Document

[Patent Document 1] JP-A-2011-141290
[Patent Document 2] JP-A-2013-210284

SUMMARY OF THE INVENTION

Problem that the Invention is to Solve

However, in the related art disclosed in Patent Document 2, monitoring of the voltage waveform which represents the temporal change of the voltage between the electrodes is required and signal processing in an analog manner for observing a signal waveform thereof to find the rise and fall of the voltage or the like is required, and implementation of mounting of the flame detection device is not easy.

In order to solve the problem, the present invention has an object that a quantity of received light can be uniquely obtained with computation by only measuring the number of peaks of an electrical signal flowing from a flame sensor.

Means for Solving the Problem

According to the present invention, there is provided a flame detecting system constituted with a flame sensor to detect light and a calculating device. In the flame detecting system, the calculating device includes an applied voltage generating portion configured to generate a pulse to drive the flame sensor, a voltage detecting portion configured to measure an electric signal flowing in the flame sensor, a storing portion configured to store sensitivity parameters of the flame sensor in advance, and a central processing unit configured to obtain a quantity of received light of a flame using parameters of a known quantity of received light, a pulse width, and a discharge probability of the sensitivity parameters, and a discharge probability obtained from an actual pulse width and the measured number of discharge times.

Furthermore, according to the present invention, in the flame detecting system, the applied voltage generating portion may be configured to calculate a pulse width which intends to cause an arbitrary discharge probability and generate a driving pulse having the arbitrary pulse width for the flame sensor. With this, the calculation can be realized within a proper range.

According to the present invention, the flame detecting system may further include a temperature sensor configured to measure an ambient temperature of the flame sensor in which the quantity of received light of the flame is corrected by the temperature.

Advantage of the Invention

According to the present invention, a quantity of received light can be obtained with computation by a digital calculation using a known parameter group stored in advance, an actual operating quantity and a measurement amount and thus, an effect that the presence or absence of a flame can be determined easily and rapidly is obtained.

Figure 1:
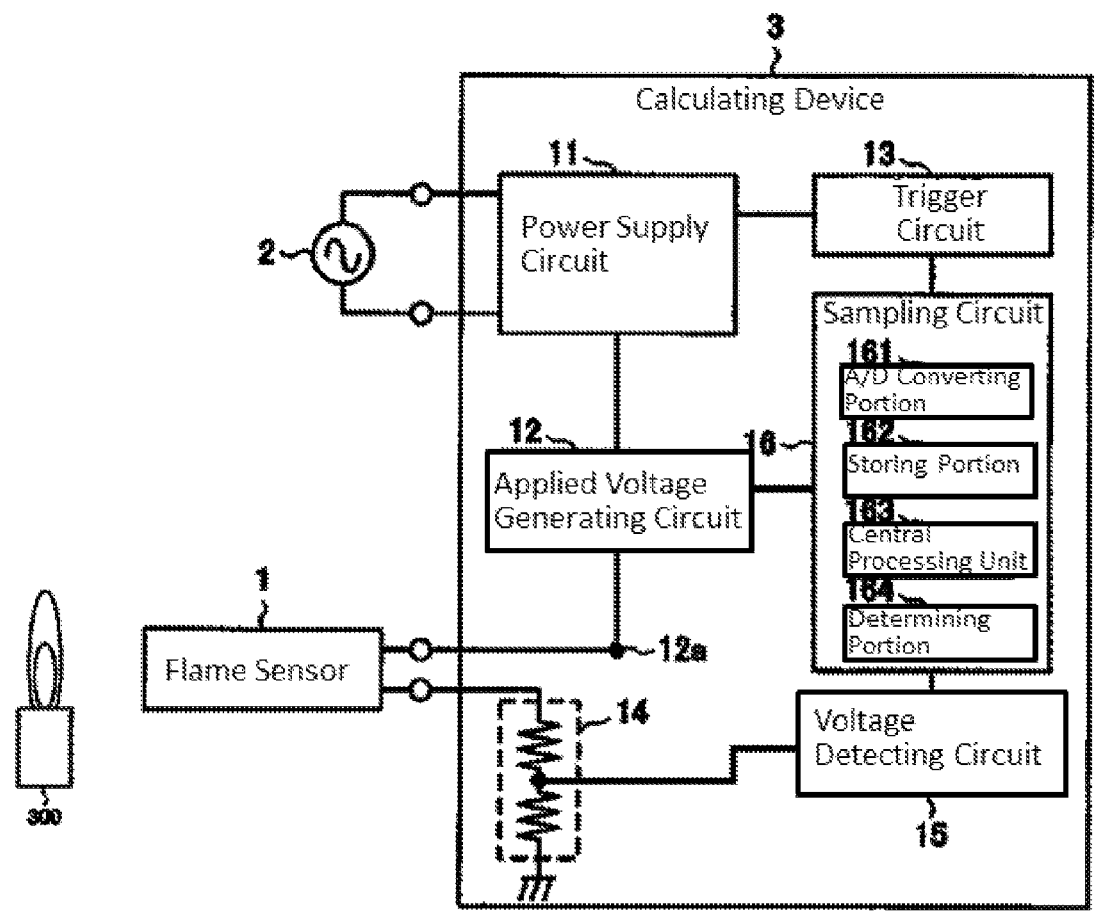
FIG. 1 illustrates a flame detecting system according to an embodiment of the present invention.

BEST MODE FOR CARRYING OUT THE INVENTION (1) Configuration of the Present Invention A flame detecting system according to an embodiment of the present invention is illustrated in FIG. 1 and the configuration thereof will be described. The flame detecting system according to the present embodiment includes a flame sensor 1, an external power supply 2, and a calculating device 3 to which the flame sensor 1 and the external power supply 2 are connected.

The flame sensor 1 is configured by an electron tube including a cylindrical envelope both ends of which are closed, an electrode pin that penetrates through the envelope, and two electrodes that are supported in parallel with each other by the electrode pin within the envelope. In such an electron tube, the electrodes are arranged to oppose a device, such as a burner, which generates a flame 300. With this, when the electrodes are irradiated with ultraviolet rays in a state where a predetermined voltage is applied across the electrodes, electrons are emitted from one electrode due to the photoelectric effect and excited in succession one after another to cause an electron avalanche between the one electrode and the other electrode. With this, a voltage, electric current, and impedance between the electrodes are changed.

The external power supply 2 is configured by a commercial AC power supply having a voltage value of, for example, 100 [V] or 200 [V].

The calculating device 3 includes a power supply circuit 11 connected to the external power supply 2, an applied voltage generating circuit 12 and a trigger circuit 13 that are connected to the power supply circuit 11, an output terminal 12a of the applied voltage generating circuit 12, a voltage dividing resistor 14 connected to an electrode pin of a downstream side of the flame sensor 1, a voltage detecting circuit 15 connected to the voltage dividing resistor 14, and a sampling circuit 16 to which the voltage detecting circuit 15 and the trigger circuit 13 are connected.

The power supply circuit 11 supplies the AC power received from the external power supply 2 to the applied voltage generating circuit 12 and the trigger circuit 13 and acquires power for driving the calculating device 3.

The applied voltage generating circuit 12 boosts the AC voltage applied by the power supply circuit 11 to a predetermined value and applies the AC voltage to the flame sensor 1. In the present embodiment, a pulsed voltage of 400 [V] is applied to the flame sensor 1.

The trigger circuit 13 detects a predetermined value point of the AC voltage applied by the power supply circuit 11 and inputs the detected result to the sampling circuit 16. In the present embodiment, the trigger circuit 13 detects a minimum value point at which a voltage value becomes a minimum value. In this manner, a predetermined value point regarding an AC voltage is detected and thus, it is possible to detect one cycle of the AC voltage.

The voltage dividing resistor 14 generates a reference voltage from a terminal voltage of the downstream side of the flame sensor 1 and inputs the reference voltage to the voltage detecting circuit 15. The terminal voltage of the flame sensor 1 is a high voltage of 400 [V] as described above and thus, if the terminal voltage is input to the voltage detecting circuit 15 as it is, a heavy load is imposed on the voltage detecting circuit 15. In the present embodiment, the presence or absence of the flame is determined not on the basis of an actual value of the voltage between the terminals of the flame sensor 1 but on the basis of the temporal change of the terminal voltage of the flame sensor 1, that is, a shape of a pulse waveform of the voltage value between the terminals for each unit time. Accordingly, by the voltage dividing resistor 14, the reference voltage in which the change in the voltage between the terminals of the flame sensor 1 is represented, and having a lower voltage value is generated, and the reference voltage is input to the voltage detecting circuit 15.

The voltage detecting circuit 15 detects the voltage value of the reference voltage input from the voltage dividing resistor 14 and inputs the voltage value to the sampling circuit 16.

The sampling circuit 16 determines the presence or absence of the flame on the basis of the voltage value of the reference voltage input from the voltage detecting circuit 15 and a triggering time point input from the trigger circuit 13. In a case where flames occur and thus the flame sensor 1 is irradiated with ultraviolet rays, the electrodes are irradiated with ultraviolet rays and electrons are emitted from one electrode due to the photoelectric effect and the electrons are excited in succession one after another to cause an electron avalanche between the one electrode and the other electrode, and electric current abruptly increases due to the electron avalanche such that emission of electrons accompanied by light emission occurs. Accordingly, the sampling circuit 16 obtains the quantity of received light with computation on the basis of a shape of the voltage waveform having such a pulse shape. The sampling circuit 16 includes an A/D converting portion 161 which generates a voltage value and a voltage waveform by performing an A/D conversion on the input reference voltage, a central processing unit 163 which analyzes the voltage value and the voltage waveform generated by the A/D converting portion 161 and performs calculation, which will be described later, and a determining portion 164 that determines the presence or absence of the flame on the basis of the quantity of received light calculated by the central processing unit 163.

(2) Operation of Flame Detection

Next, description will be made on operation of flame detection according to the present embodiment with reference to FIG. 2.

First, the calculating device 3 applies a high voltage to the flame sensor 1 by the applied voltage generating circuit 12. In such a state, the trigger circuit 13 applies a trigger when the AC voltage input to the power supply circuit 11 from the external power supply 2, that is, the value of the voltage applied to the flame sensor 1 by the applied voltage generating circuit 12 rises from the minimum value point.

Figure 2:
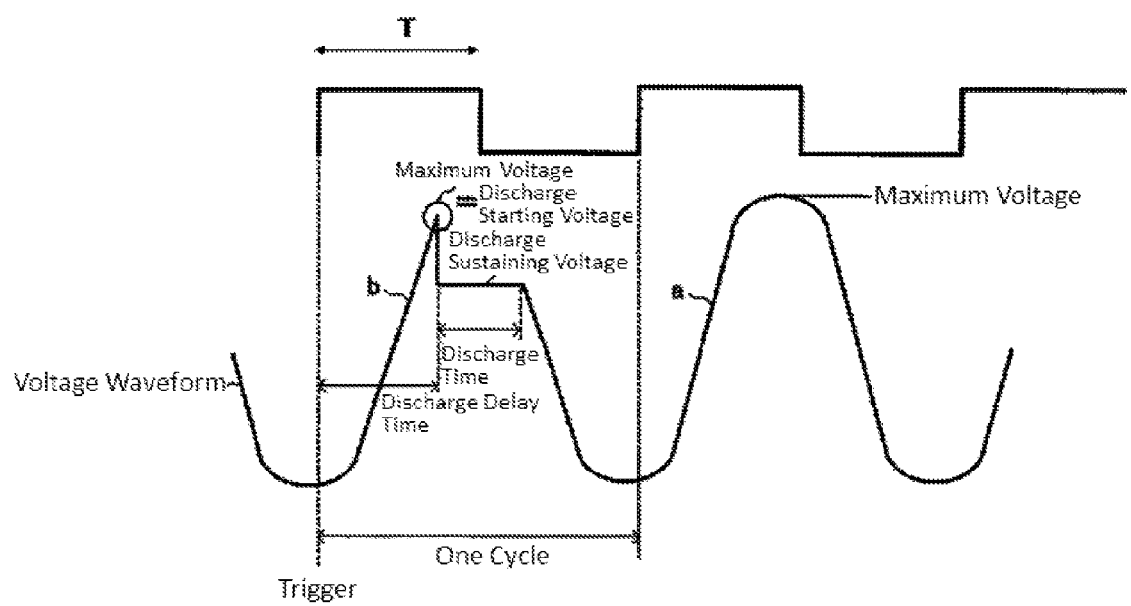
FIG. 2 is a waveform diagram for explaining a discharge waveform.

When the applied voltage passes through the minimum value point, a voltage waveform, which represents the temporal change of the voltage value illustrated in FIG. 2, is applied. As an example, in a case where the voltage value is detected every 0.1 [msec], when a frequency of the external power supply 2 is assumed as 60 [Hz], one cycle is 16.7

[msec] and thus, the voltage values detected for one cycle are 167 samples, and the sampled data is input to the central processing unit 163.

In the present example, in a case where the flame is not occurring, the voltage waveform at terminal 12a to be applied to the electrodes of the flame sensor 1 has a gentle shape having a sine wave (hereinafter, referred to as a "normal waveform") as illustrated in a reference symbol a of FIG. 2. On the other hand, in a case where the flame occurs and the flame sensor 1 is irradiated with ultraviolet rays, the voltage waveform has a characteristic shape (hereinafter, referred to as a "discharge waveform") in which the voltage value falls in the vicinity of the positive extreme value, the location where the voltage value has fallen continues for a predetermined time and then, the voltage waveform returns to the sine wave as illustrated in a reference symbol b of FIG. 2. One of the features of the present invention is to regard a state where the maximum voltage is equal to a peak of discharge starting voltage as a single discharge time by the voltage detecting circuit 15. In the meantime, a pulse width to drive the flame sensor 1 is denoted by T in the rectangular pulse illustrated in the upper part of FIG. 2.

In the meantime, it is appropriate for an actual circuit to have a DC circuit configuration and thus, the power supply circuit 11 or the applied voltage generating circuit 12 has an AC to DC converter built therein and the DC output voltage thereof is applied to the flame sensor 1. The discharge probability is obtained in the following sequence.

1. When a rectangular trigger controlled to have a width T is applied to the applied voltage generating circuit 12 from the central processing unit 163, an applying voltage is applied to the flame sensor 1 in synchronization with the trigger.
2. When the flame sensor 1 does not discharge, an electric current does not flow in the flame sensor 1 and the voltage dividing resistor 14 of the downstream side of the flame sensor 1 is connected to a ground and thus, the voltage is not generated.
3. When the flame sensor 1 discharges, an electric current flows in the flame sensor 1 and a potential difference occurs between both ends of the voltage dividing resistor 14.
4. Whether the voltage has been generated in the downstream side of the flame sensor 1 is detected by the voltage detecting circuit 15.
5. The central processing unit 163 computes the discharge probability using the number of rectangular triggers sent to the applied voltage generating circuit 12 and the number of times that a predetermined voltage is detected by the voltage detecting circuit 15.

(3) Basic Principle of the Present Invention

The flame detecting system which uses the photoelectric effect obtains the quantity of received light according to the following operation principle and thus, the operation principle will be described.

It is considered that a probability that discharge occurs when a single photon collides with a photoelectric sensor is $P_1$ and a probability that discharge occurs when two photons collide with the photoelectric sensor is $P_2$. Since $P_2$ is an inverse of a probability that discharge does not occur when a first photon collides with the photoelectric sensor and also when a second photon collides with the photoelectric sensor, a relationship between $P_1$ and $P_2$ is expressed as Equation 1.

$$(1-P_2)=(1-P_1)^2 \quad \text{[Equation 1]}$$

In general, when a probability that discharge occurs when n photons impinge on the sensor and a probability that discharge occurs when m photons impinge on the sensor are assumed as $P_n$ and $P_m$, respectively, Equation 2 and Equation 3 are established similar to Equation 1.

$$(1-P_n)=(1-P_1)^n \quad \text{[Equation 2]}$$

$$(1-P_m)=(1-P_1)^m \quad \text{[Equation 3]}$$

Equation 4 to Equation 6 are derived from Equation 2 and Equation 3 as a relationship between $P_n$ and $P_m$.

$$(1-P_n)^{\frac{1}{n}} = (1-P_m)^{\frac{1}{m}} \quad \text{[Equation 4]}$$

$$(1-P_n)^{\frac{m}{n}} = (1-P_m) \quad \text{[Equation 5]}$$

$$\frac{m}{n} = \log_{(1-P_n)}(1-P_m) \quad \text{[Equation 6]}$$

When it is assumed that the number of photons incoming to the electrode per unit time is E and a time period during which a voltage greater than or equal to the discharge starting voltage is applied (hereinafter, referred to as a "pulse width") is T, the number of photons that collide with the electrode per each voltage application is represented as E*T.

When the same flame sensor is caused to operate in a certain condition A and another condition B, a relationship among the number of photons E, the time period T, and the probability P is represented by Equation 7. In addition, if the number of photons to be assumed as a reference is set to $E_0$ and $Q=E/E_0$ is set, Equation 8 is derived. Q is referred to as a quantity of received light. The quantities of received light for the condition A and the condition B are $Q_A$ and $Q_B$, respectively.

$$\frac{E_B T_B}{E_A T_A} = \log_{(1-P_A)}(1-P_B) \quad \text{[Equation 7]}$$

$$\frac{Q_B T_B}{Q_A T_A} = \log_{(1-P_A)}(1-P_B) \quad \text{[Equation 8]}$$

EXAMPLE

Next, a flow of the quantity of received light calculation which is a main part of the present invention will be described using operations of the central processing unit 163. The central processing unit 163 is configured by a CPU.

Example 1

Figure 3:
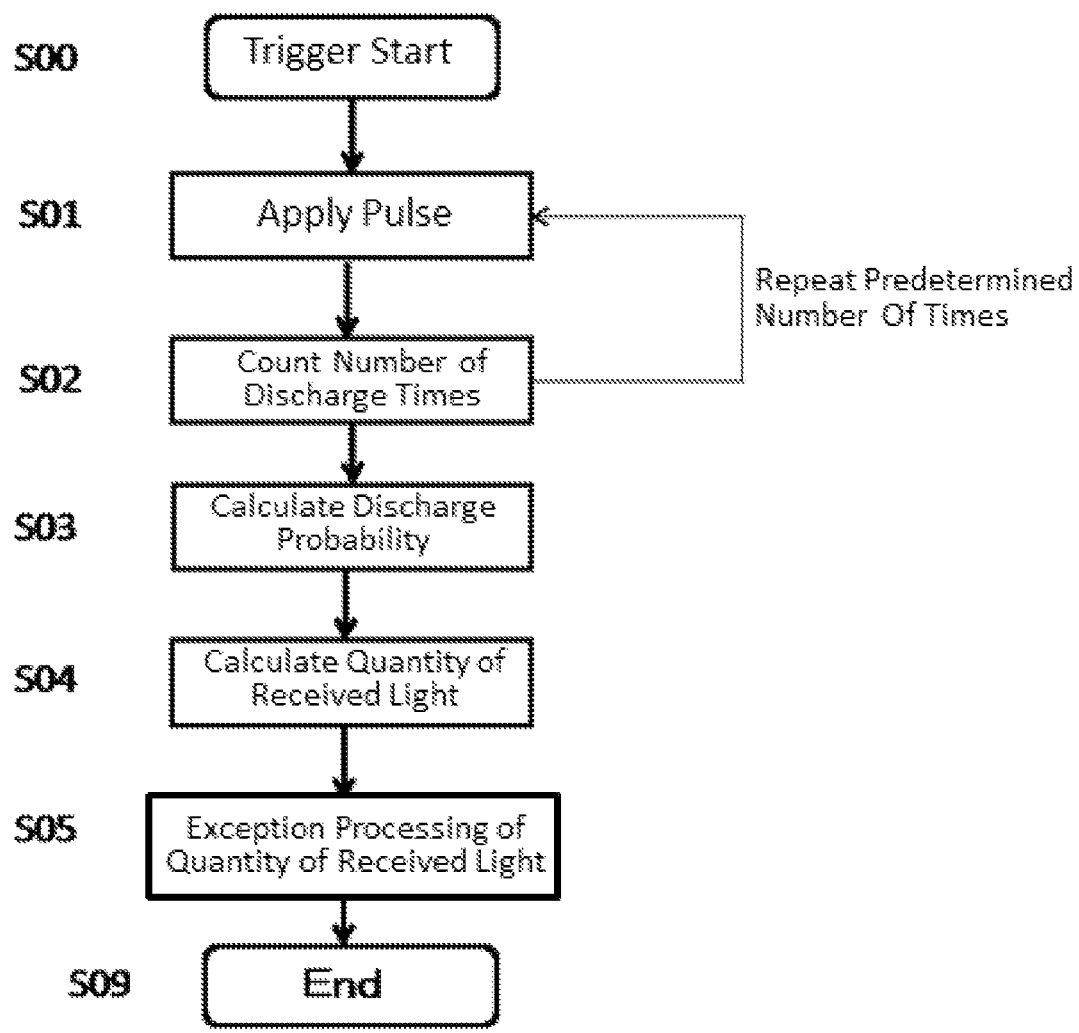
FIG. 3 illustrates a flow of a central processing unit which is a first embodied aspect of the present invention.

Description will be made on the flow of FIG. 3 (step in the figure is denoted by Snn).

The operations of the central processing unit 163 are formed of steps for driving the flame sensor 1 with a pulse voltage and calculating the quantity of received light for the flame from a driven result of the flame sensor 1.

A predetermined trigger is received and the flow is started (S00).

The flame sensor is driven to operate the applied voltage generating circuit 12 to apply the voltage greater than or equal to the discharge starting voltage to the flame sensor 1 using a rectangular pulse T having a certain width (S01).

The number of discharge times of the flame sensor 1 caused by repeatedly applying the pulse T to the flame sensor 1 for a predetermined number of times is counted by the signal obtained through the voltage detecting circuit 15 (S02).

The discharge probability P is calculated from the number of discharge times and the number of applied pulses (S03).

The quantity of received light is calculated from the discharge probability (S04). In a case where the discharge probability is other than 0 or 1, the quantity of received light is obtained using a digital calculation by the following Equation 10.

In a case where the discharge probability is 0, the quantity of received light is assumed as 0. A case where the discharge probability is 1 is excluded from a target to be calculated (S05).

$$\frac{QT}{Q_0 T_0} = \log_{(1-P_0)}(1-P) \quad \text{[Equation 9]}$$

$$Q = \frac{Q_0 T_0}{T} \log_{(1-P_0)}(1-P) \quad \text{[Equation 10]}$$

In Equation 9 and Equation 10 described above, it is assumed that a discharge probability $P_0$ based on a quantity of received light $Q_0$ under a certain operation condition and a pulse width $T_0$ under the condition has already been known. The discharge probability is, for example, measured based on the determined quantity of received light and the pulse width in a shipment inspection in the flame sensor 1 and is stored in the storing portion 162.

In this case, the relationship among the quantity of received light Q, the pulse width T, and the discharge probability P is obtained by using Equation 9 and thus, the quantity of received light $Q_0$, the pulse width $T_0$, and the discharge probability $P_0$ are referred to as sensitivity parameters of the flame sensor 1.

The $Q_0$, the $T_0$, and the $P_0$ are already known and have been stored. The pulse width T is a pulse width which is actually output from the applied voltage generating circuit 12 by the central processing unit 163 and thus, the pulse width T is a known number. The discharge probability P can be obtained by actually applying the pulse for plural times and counting the number of discharge times as a result of the application of the pulses. Then, the quantity of received light Q which is an unknown number can be uniquely calculated from Equation 10.

In the following, a second example will be described. This example is related to a flame detecting system in which the applied voltage generating portion calculates the pulse width for causing an arbitrary discharge probability and generates a driving pulse having an arbitrary pulse width for the flame sensor. That is, the pulse width is adjusted so as to expand a measurable range of quantity of light.

Example 2

It is assumed that the pulse width T and the discharge probability P are known in the condition A in Equation 8 described above. For a certain quantity of received light, the flame sensor 1 is activated for plural times using the pulse width T and the discharge probability P is obtained. In this case, it is assumed that a discharge probability is intended to be adjusted to an arbitrary value $P_C$ when the next pulse is applied (this is assumed as condition C). Then, a relationship between the condition A and the condition C is expressed as Equation 11. However, it is assumed that the quantity of received light Q is not changed. Equation 12 may also be obtained by performing transformation.

$$\frac{Q_B T_C}{Q_A T_A} = \log_{(1-P_A)}(1-P_C) \quad \text{[Equation 11]}$$

$$T_C = T_A \log_{(1-P_A)}(1-P_C) \quad \text{[Equation 12]}$$

A pulse width Tc to be set in the condition C can be calculated from Equation 12. The discharge probability can be adjusted to the arbitrary (optimum) value $P_C$ in the next plurality of pulses $T_C$. With this, the discharge probability P is adjusted to an arbitrary value and the same quantity of received light Q can be obtained, and the optimum operation condition can be expected.

Figure 4:
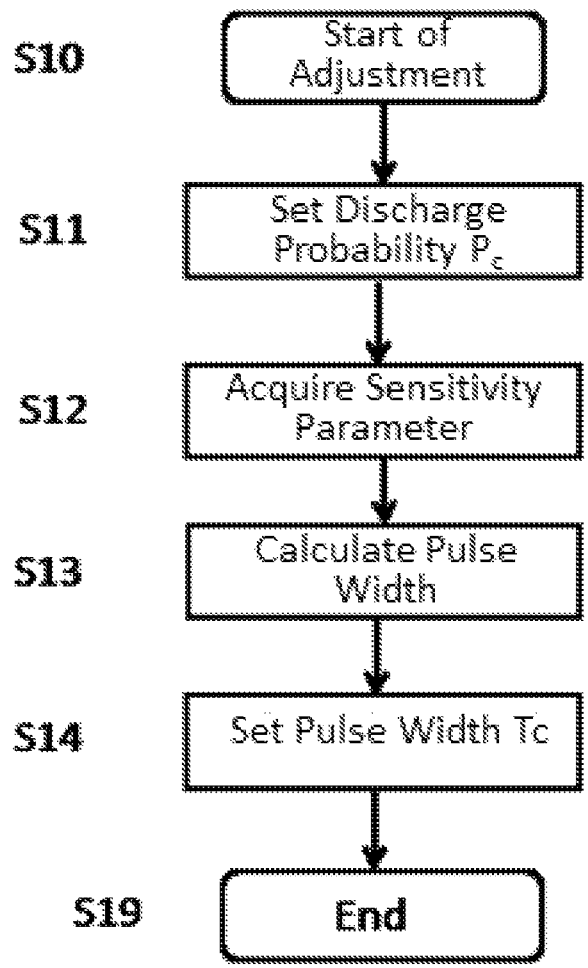
FIG. 4 illustrates a flow of a central processing unit which is a second embodied aspect of the present invention.

Description will be made on the flow of FIG. 4 (step in the figure is denoted by Snn).

Although the present adjustment logic operates asynchronously with the calculation of the quantity of received light of Example 1, the adjustment logic is also executed by the central processing unit 163 with no change.

The adjustment processing is started (S10).

A desired discharge probability $P_c$ intended to be adjusted is set (S11).

The sensitivity parameters of the known pulse width T and the discharge probability P are acquired from the storing portion 162 (S12).

The pulse width Tc to be set is calculated from Equation 12 (S13).

The parameters are delivered to the main routine of the calculation of quantity of received light present in Example 1 through communication between tasks, storing means, or the like so as to set the pulse width Tc (S14).

Additionally, it is needless to say that even though the discharge probability which is exactly the same as $P_c$ is not obtained as a result of execution of the main routine to obtain the actual quantity of received light using the pulse width Tc, a quantity of received light $Q_D$ which causes a discharge probability $P_D$ can be obtained using Equation 10 by the calculation process of quantity of received light present in Example 1.

Other Examples

A flame detecting system which is provided with a temperature sensor to measure an ambient temperature of a flame sensor and corrects a quantity of received light of the flame by the temperature is considered. The flame detecting system corresponds to correction functionality in a case where there is a difference between the ambient temperature at the time of preparing the sensitivity parameters and the ambient temperature in the actual installation site of the flame detecting system. This is because the temperature characteristics are included in the sensitivity parameters of the flame sensor 1 and the temperature characteristics need to be taken into account in the calculation of the quantity of received light.

In this case, the flame detecting system may be obtained by adding the temperature sensor to the flame detecting system according to the first embodiment illustrated in FIG. 1 (not illustrated). The temperature sensor is to measure the temperature in an installation environment of the flame sensor 1. The measurement results by the temperature sensor are output to the central processing unit 163. In the flame detecting system, in a case where the equivalent flames are present, the operations are corrected such that the quantities of received light become equivalent to each other, on the basis of the acquired sensitivity parameter and the temperature measured by the temperature sensor. Furthermore, the temperature sensor may be built in the flame sensor 1 and/or provided separately from the flame sensor 1.

As another example, a concept of an effective electrode surface area may be introduced to the flame sensor 1. Then, it is possible to calculate the brightness of the flame 300 by dividing the quantity of received light by the effective electrode surface area. The effective electrode surface area means an area on which light impinges of the electrode surface area of the flame sensor 1 and thus, the effective electrode surface area corresponds to a parameter unique to the flame sensor 1.

INDUSTRIAL APPLICABILITY

Various modifications can be made. Although not mentioned in the present example, shutter functionality can be provided on the envelope of the flame sensor 1 to be used in a flame detecting system for detection of a pseudo flame. Such design modification is also included in a scope of the present invention.

DESCRIPTION OF REFERENCE NUMERALS AND SIGNS

1: flame sensor
2: external power supply
3: calculating device
11: power supply circuit
12: applied voltage generating circuit
13: trigger circuit
14: voltage dividing resistor
15: voltage detecting circuit
16: sampling circuit
161: A/D converting portion
162: storing portion
163: central processing unit
164: determining portion
300: burner flame.

The invention claimed is:

1. A flame detecting system comprising:
a flame sensor configured to detect light; and
a calculating device,
wherein the calculating device comprises:
an applied voltage generating circuit configured to generate a pulse to drive the flame sensor,
a voltage detecting circuit configured to measure an electric signal flowing in the flame sensor,
a storage memory configured to store sensitivity parameters of the flame sensor in advance, and
a central processing unit configured to obtain a quantity of received light of aflame using parameters of a known quantity of received light, a pulse width, and a discharge probability of the sensitivity parameters, and a discharge probability obtained from an actual pulse width and the measured number of discharge times.

2. The flame detecting system according to claim 1, wherein the applied voltage generating circuit is configured to calculate a pulse width which intends to cause an arbitrary discharge probability and generate a driving pulse having the calculated pulse width for the flame sensor.

3. The flame detecting system according to claim 1, further comprising:
a temperature sensor configured to measure an ambient temperature of the flame sensor,
wherein the quantity of received light of a flame is corrected by the temperature.

* * * * *